United States Patent Office 3,056,680
Patented Oct. 2, 1962

3,056,680
PROCESSES FOR THE TENDERING OF MEAT
Beverly E. Williams, La Grange Park, Ill., assignor to Hodges Research and Development Company, New York, N.Y., a corporation of California
No Drawing. Filed Aug. 17, 1960, Ser. No. 50,062
2 Claims. (Cl. 99—107)

This invention relates to processes for the tendering of meat and more particularly to such processes in which certain specific enzymes in aqueous solution are stitch pumped into the carcass immediately after slaughter to act upon the collagen and elastin of the connective tissues.

After the onset of rigor mortis in beef it has been observed that random diffusion or redistribution of ions takes place for one reason or another changing the hydration of the muscle proteins and particularly actomyosin.

These observations tend to lend credence to the idea that post-mortem changes in muscle protein are in the nature of an ion-protein interaction. It may well be that post-mortem intramuscular changes are a combination of any or all three phenomena—proteolysis, dissociation of actomyosin, or ionic rearrangement to increase the degree of protein hydration.

It is believed that increases in tenderness with post-mortem age may be related to the dissociation of actomyosin or some similar protein changes which increase protein extractability and/or the redistribution of ions within muscle thus causing increased hydration.

It also may be that tenderness is related to the degree of hydration of meat proteins and that post-mortem tenderization may be due to certain ion-protein or protein-protein interactions rather than the classical proteolysis or even the dissociation of actomyosin. No large amount of proteolysis seems to take place during aging.

Tenderness in meat involves the physical, physiological and biochemical properties of skeletal muscle. Muscle consists of elongated cells, containing jelly-like protoplasm supported by a framework of connective tissue. Although it is quite understandable that a large quantity of connective tissue will affect tenderness, evidence which has been presented in recent years indicates that increases in tenderness with post-mortem age involve changes in the muscle plasma more than in the connective tissue, which seems to remain largely unchanged during the aging process.

Intracellular muscle constituents are largely protein and serve physiologically the functions of contraction and relaxation.

The muscle plasma proteins of greatest interest are myosin, actin and actomyosin which account for about half of the muscle proteins and are usually considered of primary importance in contraction. Other proteins of muscle plasma are myoalbumin, myoglobulin and the chromoprotein myoglobin which accounts for the color of meat.

Initial toughening of meat at slaughter is known to be due to the formation of the actomyosin complex from actin and myosin and subsequent tenderization is the dissociation of actomyosin into actin and myosin. Subsequent tenderization involves, not extensive dissociation of actomyosin, but only a slight dissociation; this is coupled with or is brought about by a redistribution of the ionic atmosphere associated with the plasma proteins. In other words, post-mortem tenderization may be a manifestation of the general problem of the relation of ions to protein hydration.

Therefore, since post-mortem aging and most proteolytic added enzymes tend to improve tenderness of the meat without softening or tendering the connective tissue, an enzyme or combination of enzymes is needed to act upon the collagen and elastin of connective tissue.

It is therefore the object of the present invention to provide novel processes in which the carcasses to be tendered are stitch pumped after slaughter and "dressing" with an aqueous solution of enzymes which will tender the collagen and elastin of connective tissue.

Most unexpectedly, I have found that the only microbial enzymes capable of attacking the native collagen and elastin are collagenase and elastase.

Collagenase is obtained from clostridium histolyticum. It works in an acid pH and is effective on collagen. Elastase is obtained from hog pancreas and is effective in an alkaline pH (circa 8.8). Thus the two are synergistic, one working during the alkaline state of freshly slaughtered beef, before rigor mortis, and the other working during the acid state of beef in rigor. Rigor mortis is either caused by or accompanied by periodic spontaneous outbursts of lactic acid.

About 80% of the connective tissue in beef is collagen and about 20% elastin. Examples of collagen are Achilles' heel and examples of elastin are the ligamentum nuchae, commonly called backstrap, the ligmament that runs along the backbone of the cattle.

The only microbial enzymes capable of attacking native collagen under pyhsiological conditions of pH and temperature are *Clostridium welchii* and *Clostridium histolyticum collagenases,* excreted into the culture filtrates of these two closely related bacteria.

Heating to 132.8° F. for 30 minutes or to 176° F. for 10 minutes completely inactivates the enzyme. After 24 hours at 98.6° F. 20% of the activity is lost.

Collagenase is an enzyme that (*a*) breaks down native collagen which is resistant to all common proteolytic enzymes and (*b*) specifically attacks only collagen and its degradation products without effect on related proteins or synthetic substrates.

The term collagen refers to a chemical substance of animal origin. Collagen is a natural fibrous high polymer possessing little elasticity but great mechanical strength.

Collagen is a simple albuminoid protein, which is, at ordinary temperatures insoluble in water, dilute acids and alkalies, and solutions of salts such as sodium chloride and ammonium sulfate. In its native state, collagen is resistant to digestion by most proteolytic enzymes. Collagen has physiochemical properties which set it apart from other proteins. These are its characteristic isoelectric point, the properly of birefringence, and swelling reactions in acids, alkalies and solutions of certain salts such as barium chloride and calcium chloride. When heated gradually in water, collagen shrinks within a small but well-defined temperature range.

Several sides of beef were stitch pumped with a solution containing one gram each of collagenase and elastase. This solution contained six pints of potable water. In some of the tests an isotonic salt solution was added. The weight of the solution was approximately 3% of the weight of side of beef. The amount of salt in the solution was .8%. The salt did not contribute to tenderness and its purpose was to maintain the salt percentage naturally in beef. Companion steaks from the pumped and the control sides were taste tested the day after slaughter and no significant improvement in tenderness was found. The beef was hung four more days, and at the end of the fifth day from slaughter, a difference in tenderness was perceived, although perhaps not commercially significant.

While this beef was hanging, two more sides of two other cattle were treated, in exactly the same manner as described above, except that in the case of the first cattle the pumped side was heat treated and in the case of the second cattle both sides were heat treated. For the heat treament, the sides of beef were placed in a super-heated live steam room. The temperature of the room was maintained slightly under 120° F. The sides were allowed to remain in this room until the internal temperature of the longissimus dorsi muscle (loin and rib-eye) increased five to ten degrees from normal body, to approximately 105° to 110° F. The time required was from about 1 to 2 hours. After heat treating, the sides were placed in the usual cooler and chilled in the regular manner to approximately 35° F. Subsequently, with diathermal heating equipment, the beef sides were rapidly and uniformly elevated to the above temperatures, within a matter of minutes. The temperature attained, not the time required, however, is the critical factor.

The next day streaks from the pumped side were compared with similar streaks from the mate control side, both sides having been heat treated. Likewise, streaks from the pumped side, heat treated were compared with the control side, not heat treated. This eating test was repeated again five days after slaughter.

In both tests, the improvement of the pumped side was noticeable over the not pumped or control side. The improvement was much greater and commercially significant in the heat treated, pumped side compared with the not heat treated, not pumped side (control).

It is to be concluded that the heat treatment, which promptly precipitated rigor mortis, contributed greatly to the activity of the collagenase, which is active and effective in the acid pH range, and beef is in this range during rigor mortis. Thus by the addition of the step of heat treating, the efficiency of the collagen enzyme which acts upon collagen is greatly increased and, as mentioned above, collagen accounts for about 80% of the connective tissue of a beef carcass. Without the step of heat treating, no significant improvement was had with these enzymes either at 24 hours or five days but with heat treatment, with the enzymes of collagenase and elastase a great improvement was had in 24 hours and an equal difference at the end of five days. These results are of significance to the packer who can now make his beef more tender more quickly and within the normal limits of in-plant storage and shipment.

The temperature of the injected solution ranged from normal body temperature of around 100° F. to not over 120° F.

This process is also most effective in tendering lamb and veal and may be used with sides or major cuts of meat.

It should now be apparent that the objective of the present invention is obtained by the processes described above.

Changes in or modifications to the above described illustrative procedures may now be suggested to those skilled in the art without departing from the present inventive concept. Reference should therefore be had to the appended claims to determine the scope of this invention.

What is claimed is:

1. In a process for tendering meat the steps of stitch pumping the major portions of the carcass after slaughter and before the completion of rigor mortis with an aqueous solution weighing approximately 3% of the dressed weight of the meat containing approximately 1 gram each of the microbial enzymes collagenase and elastase at temperatures of approximately 100° F. to 120° F., then elevating the temperature of the meat from 5° to 10° above normal body temperature and then chilling the meat to approximately 35° F.

2. A process as described in claim 1 in which the meat is stored at approximately 35° F. for at least a day.

References Cited in the file of this patent

UNITED STATES PATENTS

| | | |
|---|---|---|
| 2,805,163 | Williams et al. | Sept. 3, 1957 |
| 2,904,442 | Underkofler | Sept. 15, 1959 |
| 2,963,376 | Hogan et al. | Dec. 6, 1960 |

OTHER REFERENCES

"Chemistry and Methods of Enzymes," 1953, Third Edition, by J. B. Sumner et al., published by Academic Press, Inc., New York, page 179.